United States Patent
Freeman et al.

(10) Patent No.: US 9,251,355 B2
(45) Date of Patent: Feb. 2, 2016

(54) FIELD LEVEL DATABASE ENCRYPTION USING A TRANSIENT KEY

(71) Applicant: International Business Machines Corporation, Armonk, NY (US)

(72) Inventors: William C Freeman, Marietta, GA (US); Richard V Hom, Troy, MI (US)

(73) Assignee: International Business Machines Corporation, Armonk, NY (US)

(*) Notice: Subject to any disclaimer, the term of this patent is extended or adjusted under 35 U.S.C. 154(b) by 190 days.

(21) Appl. No.: 13/953,861

(22) Filed: Jul. 30, 2013

(65) Prior Publication Data

US 2015/0039901 A1    Feb. 5, 2015

(51) Int. Cl.
  *H04L 29/00* (2006.01)
  *G06F 21/60* (2013.01)
  *G06F 21/62* (2013.01)

(52) U.S. Cl.
  CPC .......... *G06F 21/602* (2013.01); *G06F 21/6227* (2013.01)

(58) Field of Classification Search
  CPC .......................... G06F 21/602; G06F 17/30289
  See application file for complete search history.

(56) References Cited

U.S. PATENT DOCUMENTS

| | | | |
|---|---|---|---|
| 5,604,801 A | 2/1997 | Dolan et al. | |
| 6,381,696 B1 | 4/2002 | Doyle | |
| 7,734,052 B2 | 6/2010 | Braskich et al. | |
| 8,363,834 B1 | 1/2013 | Singhal | |
| 2003/0046572 A1* | 3/2003 | Newman et al. | 713/193 |
| 2003/0123671 A1* | 7/2003 | He et al. | 380/282 |
| 2006/0053112 A1 | 3/2006 | Chitkara et al. | |
| 2007/0192603 A1 | 8/2007 | Ishiguro et al. | |

FOREIGN PATENT DOCUMENTS

| | | | |
|---|---|---|---|
| WO | 2008030705 A2 | 10/2007 | |
| WO | 2007111710 A2 | 3/2008 | |

OTHER PUBLICATIONS

Gilles Brassard, "Relativized Cryptography", IEEE Transactions on Information Theory, 1983.
Xu Huang et al., "Agent-Oriented Novel Quantum Key Distribution Protocol for the Security in Wireless Network", University of Canberra Australia, 2009.

* cited by examiner

*Primary Examiner* — Brandon Hoffman
*Assistant Examiner* — Helai Salehi
(74) *Attorney, Agent, or Firm* — Isaac J. Gooshaw; Jason H. Sosa

(57) ABSTRACT

Embodiments of the present invention disclose a method, system, and computer program product for implementing user specific encryption in a database system. A computer receives a query statement including a user specific key and data, the data including data needing encryption and non-encrypted data. The computer encrypts the data needing encryption using the user specific key. The computer inserts both the encrypted data and the non-encrypted data into a table row in a database. The computer creates a hash of the user specific key, and stores the hash of the user specific key in the table row with the data.

20 Claims, 4 Drawing Sheets

FIELD LEVEL DATABASE ENCRYPTION USING A TRANSIENT KEY

FIELD OF THE INVENTION

The present invention relates generally to the field of database management systems, and more particularly to data protection from unauthorized access through personalized encryption.

BACKGROUND OF THE INVENTION

Enormous amounts of data are being stored through web applications every day. Computer databases allow storage of digital data in an organized format that allows for searches to retrieve a particular subset of data utilizing specialized commands in a query language, such as Structured Query Language (SQL). SQL allows data entry, manipulation, and deletion. SQL statements can be generated by a client application based on user input or stored in database procedures to be run on a schedule or on request by a Database Administrator (DBA). The SQL is executed by a Database Management System (DBMS), which is a software system designed to allow administration of a database and to control access to a database.

Within a database, some data tables may contain both user sensitive information, such as birthdates, credit card numbers, etc., as well as non-sensitive information. Data protection is required to prevent unauthorized access to sensitive information. Most databases are protected by a single userid or "machine id" for all users to access the data. A second method of data protection includes the use of a unique database userid and password for each individual user, along with table definitions that include a field to allow segregation of data by the userid. This last approach requires maintenance by a Database Administrator (DBA) to create a new userid for each user and set permission access by table for each new userid, which can be time consuming on a busy database. While database files are typically encrypted as a whole, this does not prevent authorized users from seeing all the data in the table. Some encryption of table fields may be performed, but it is time and resource consuming to decrypt all rows when doing searches, causing a slow-down of database performance.

SUMMARY

Embodiments of the present invention disclose a method, computer program product, and system for implementing user specific encryption in a database system. A computer receives a query statement including a user specific key and data, the data including a data field needing encryption and a non-encrypted data field. The computer identifies the data field needing encryption. The computer encrypts the data field needing encryption using the user specific key. The computer inserts both the encrypted data field and the non-encrypted data field into a table row in a database. The computer creates a hash of the user specific key. The computer stores the hash of the user specific key in the table row with the data.

DETAILED DESCRIPTION

Figure 1:
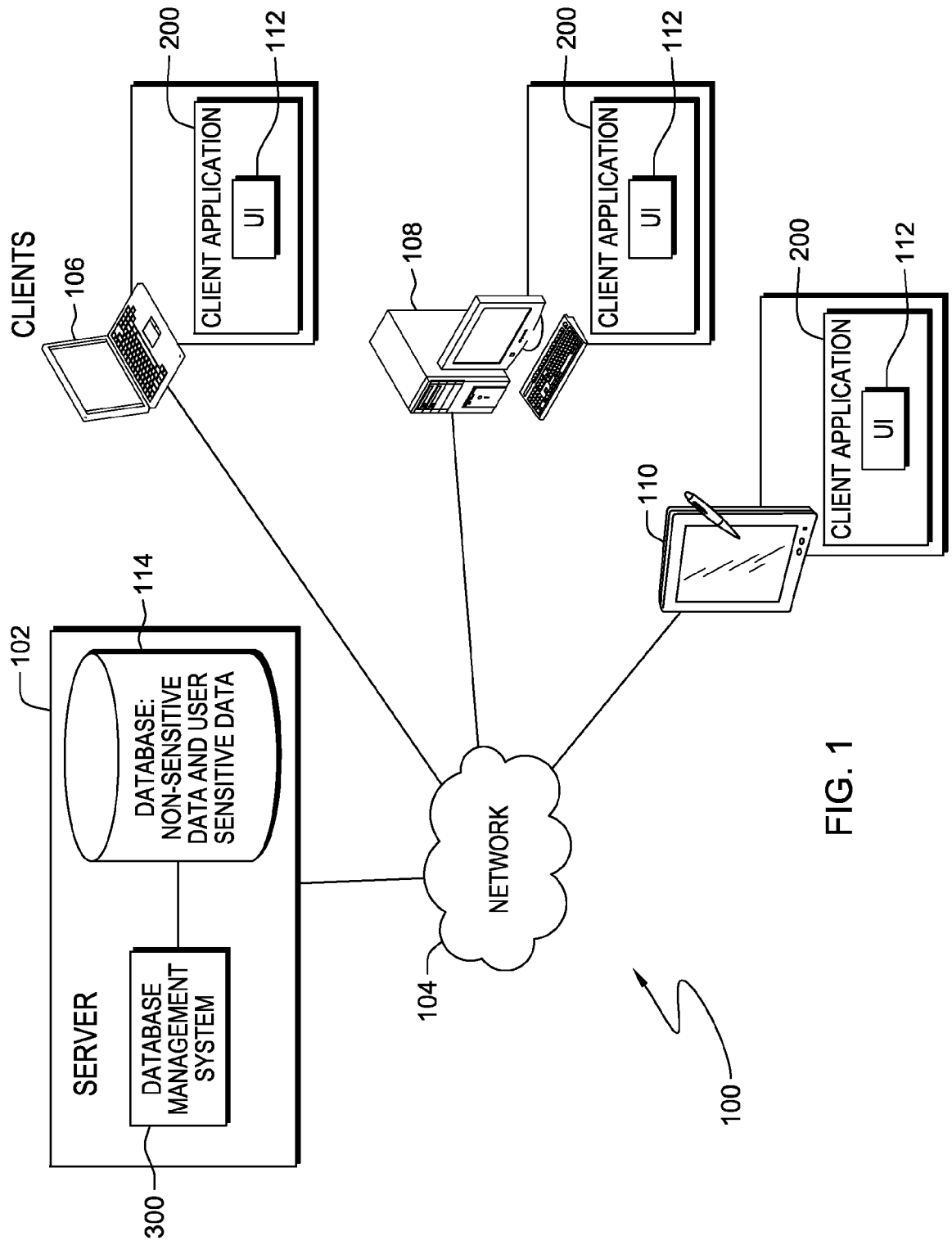
FIG. 1 is a functional block diagram illustrating a distributed data processing environment, in accordance with an embodiment of the present invention.

Embodiments of the present invention recognize database records may contain sensitive user data, and data protection techniques are desired to keep user sensitive data away from all possible unauthorized users. Further, unauthorized users can include the database administrators who may grant themselves rights to look at all data in their databases. Toward these ends, embodiments of the present invention allow each individual user to create a user specific key for encryption of selected data fields within a database table at the record level. The user specific key is stored in a non-recoverable form with each encrypted record as meta-data, and cannot be used for decryption of any encrypted fields. To decrypt user specific encrypted fields, the user resends the same user specific key. If the user specific key of an individual is compromised, only a very small portion of the encrypted data can be accessed. This not only protects the user sensitive data, but also allows the system to utilize the non-sensitive data of multiple users. Implementation of embodiments of the invention may take a variety of forms, and exemplary implementation details are discussed subsequently with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. A computer-readable signal medium may be any computer-readable medium that is not a computer-readable storage medium.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Implementation of embodiments of the invention may take a variety of forms, and exemplary implementation details are discussed subsequently with reference to the figures. The embodiment illustrated in the figures describes the interaction of a relational database and query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL.

The present invention will now be described in detail with reference to the figures. FIG. 1 is a functional block diagram illustrating a distributed data processing environment, generally designated 100, in accordance with one embodiment of the present invention. Distributed data processing environment 100 includes server computer 102, and client computers 106, 108, and 110, interconnected over network 104.

Server computer 102 may be a specialized server computer, a laptop computer, tablet computer, netbook computer, personal computer (PC), a desktop computer, a personal digital assistant (PDA), a smart phone, or any programmable electronic device capable of communicating with client computers 106, 108, and 110 via network 104. In certain embodiments, server computer 102 represents a computer system utilizing clustered computers and components that act as a single pool of seamless resources when accessed through network 104, as is common in data centers and with cloud computing applications. In general, server computer 102 is representative of any programmable electronic device or combination of programmable electronic devices capable of executing machine-readable program instructions and communicating with other computing devices via a network. Exemplary components of server computer 102 are described in greater detail with regard to FIG. 4.

In various embodiments of the present invention, client computers 106, 108, and 110 can each respectively be a laptop computer, a tablet computer, an application server, a netbook computer, a personal computer (PC), a desktop computer, a personal digital assistant (PDA), a smartphone, or any programmable electronic device capable of communicating with server computer 102 via network 104.

Network 104 can be, for example, a local area network (LAN), a wide area network (WAN) such as the Internet, or a combination of the two, and can include wired, wireless, or fiber optic connections. In general, network 104 can be any combination of connections and protocols that may support communications between server computer 102 and client computers 106, 108, and 110.

Client computers 106, 108, and 110 may each respectively include an instance of client application program 200, which executes locally on the respective client computer and has the capability to connect to database 114 on server computer 102 for data storage and retrieval. In the depicted environment, client application program 200 uses user interface 112 to receive user input, and to output responses to a user. Client application program 200 sends information to and receives information from server computer 102 over network 104. Client application program 200 provides a user specific key to server computer 102, which subsequently uses the user specific key to encrypt or decrypt data. Client application program 200 is described further in FIG. 2.

Server computer 102 includes database management system program 300 and a connection to database 114. Over network 104, server computer 102 may receive a query and the user specific key from a requestor, such as client application program 200. Database management system program 300 processes the query, which stores, updates, or retrieves the required information residing in database 114, and sends values associated with the query back to client application program 200 on a client computer. A preferred embodiment of database management system program 300 includes the capability to specify encryption of certain fields within a record or row of data in a table of database 114, and to specify a meta-data field for storage of a non-recoverable form of a user specific key to be used for encryption. Database management system program 300 is described further in FIG. 3.

Figure 2:
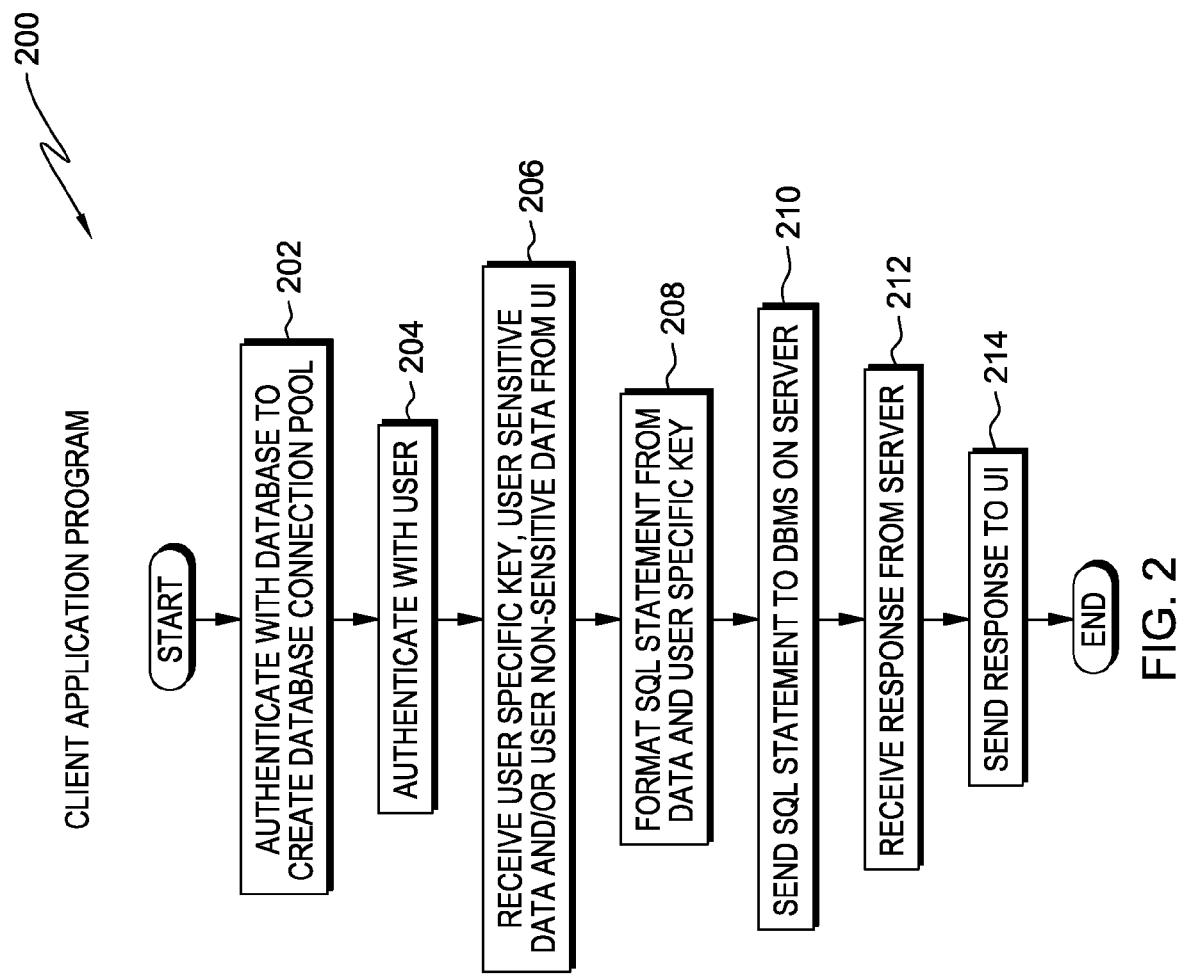
FIG. 2 is a flowchart depicting the operational steps of a client application program, inserted on a client computer within the data processing environment of FIG. 1, in accordance with an embodiment of the present invention.

FIG. 2 is a flowchart depicting the operational steps of client application program 200, in accordance with an embodiment of the present invention.

Client application program 200 authenticates with database 114 to create a database connection pool (step 202). Client application program 200 sends a request to server computer 102 through network 104 to authenticate with database 114. Authentication is a process of validating a user identity and determining the rights of a user to access server computer 102 and database 114. Rights of the user may include some or all of the following: the ability to read, update, delete, or retrieve data from specific database tables, to execute queries, to perform procedures, or to make structural changes to the database. In one embodiment, client application program 200 may send a userid and password associated with a machine id instead of an individual person. In another embodiment, client application program 200 may send a user specific userid and password. When using a user specific userid and password, client application program 200 requests this information from the user through user interface 112 before sending to server computer 102. The authentication request may generate one database connection for a single user, or several database connections forming a pool that multiple users can access. A person of ordinary skill in the art may recognize that other methods exist to perform database authentications.

Client application program 200 authenticates with the user (step 204). In one embodiment, client application program 200 requests the input of a user login through user interface 112 to verify the user login has permission to use client application program 200. Authentication may be through software, or may be through hardware keys. If the user login has the proper permission, client application program 200 proceeds to the next step. Steps 202 and 204 may be performed concurrently, and either step may be performed first. A person of ordinary skill in the art may recognize that there are other ways in which user authentication may be performed.

Client application program 200 receives a user specific key, user sensitive data, and/or user non-sensitive data from user interface 112 (step 206). In one embodiment, client application program 200 outputs a web application form to user interface 112 whereby the user inputs a user specific key to be used for encryption or decryption of data, and fills in one or more data fields, which may correspond to user sensitive data or user non-sensitive data. Through submission of the web application form, client application program 200 receives the user specific key, user sensitive data, and/or user non-sensitive data. For example, user sensitive data may include social security numbers, birthdates, credit card numbers, or anything that may not be desirable for other users to view; all other data fields may be considered user non-sensitive data. In a preferred embodiment, client application program 200 may have multiple web application forms for different uses including, but not limited to, collecting data to be stored in database 114, or collecting search terms to use to query database 114 for retrieval of previously stored data. In both cases, client application program 200 receives the user specific key as it is needed for both encryption of data to be stored, and decryption of previously stored data. In once instance, a web application form may not collect a user specific key, such as queries on non-sensitive data alone. A person of ordinary skill in the art may recognize that there are other ways in which the user specific key, user sensitive data, and user non-sensitive data may be collected through user interface 112.

Client application program 200 formats a query statement, using SQL, from data and the user specific key (step 208). Client application program 200 takes the information received from user interface 112 and creates a SQL statement with the user specific key and user data included. A SQL statement is a query or command designed for managing data stored in a database, such as database 114. For example, in the case of storing new data, an INSERT command may be created. In the case of deleting data, a DELETE command may be created. In the case of revising data that is already stored in database 114, an UPDATE command may be created. In the case where the user wants to retrieve previously stored data, a SELECT command may be created. Not all commands are listed here, but it may be recognized that others exist to those skilled in the art. In a preferred embodiment, the SQL statement may look like "INSERT INTO Schema.Tablename (Namefield, birthdatefield, userspecifickey) VALUES ('Joe Smith', '01/01/2000', "now7cq!")". The SQL statement may take other forms depending on the table definitions in database 114, and the intent of the query or command. In a preferred embodiment, client application program 200 specifies the form of the user specific key similar to a password, such that rules for length, type of characters, etc., may be expressed in many possible ways. In another embodiment, client application program 200 generates and stores the user specific key for the user on a client computer, for example client computer 106. In the instance where no user specific key is received, such as queries of non-sensitive data only, the SQL statement either does not pass a key or passes a default or blank key.

Client application program 200 sends the query statement, using SQL, to database management system program 300 on server computer 102 (step 210). In this instance, client application program 200 sends the SQL statement, which may include commands, data, and the user specific key, to database management program 300 on server computer 102 over network 104.

Client application program 200 receives a response from server computer 102 (step 212). Successful completion of the SQL statement by database management system program 300 acting on database 114 results in either an error message, a confirmation message, or a results dataset passing to client application program 200 from server computer 102 over network 104.

Client application program 200 sends the response to user interface 112 (step 214). Client application program 200 formats the response received in step 212 into either a text message, or an organized table of data sent to user interface 112. A person of ordinary skill in the art will recognize that there are other ways in which the response may be formatted or transmitted to the user. Client application program 200 may be setup to repeat steps 206 to 214 as many times as needed by the user.

Figure 3:
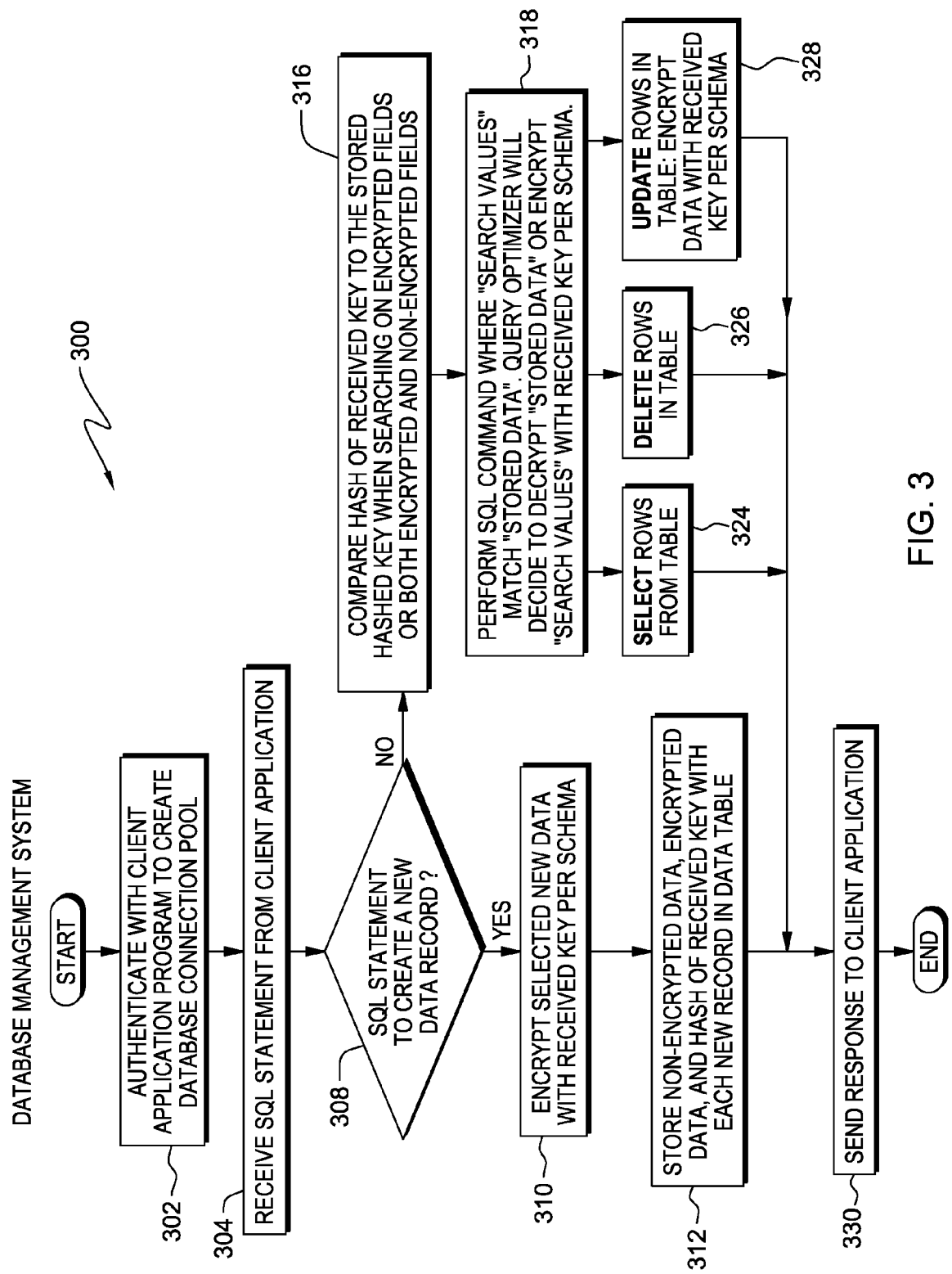
FIG. 3 is a flowchart depicting the operational steps of a database management system with a field encryption data definition language program, on a server computer within the data processing environment of FIG. 1, in accordance with an embodiment of the present invention.

FIG. 3 is a flowchart depicting the operational steps of database management system program 300, in accordance with an embodiment of the present invention. In a preferred embodiment of the invention, database management system program 300 includes a field encryption extended data definition language (feDDL), and defines a field encryption property for data fields in a database table. This change to the DDL may or may not use a field encryption extended structured query language (feSQL). Instead of a new SQL, an update to database connection software, for example a Java™ Database Connectivity (JDBC) driver, is required on client computers 106, 108, and 110. Database management system program 300 parses the feDDL to specify which data fields need user specific key encryption and stores this internally in a schema. At least one data field in a table row of the database table is identified, through the schema, as needing encryption by a user specific key. A meta-data field in the table row is identified, through the schema, as receiving a non-recoverable form of the user specific key. Database management system program 300 uses the schema information when processing database queries and commands as shown in FIG. 3.

Database management system program 300 authenticates with client application program 200, and may optionally create a database connection pool (step 302). Database management system program 300, running on server computer 102, receives a request from client application 200 through network 104 to authenticate with database 114. Authentication is a process of validating a user identity and determining the rights of a user to access server computer 102 and database 114. In one embodiment, database management system program 300 receives from client application program 200 a userid and password associated with a machine ID instead of an individual person. In another embodiment, database management system program 300 receives from client application program 200 a user specific userid and password. The authentication request may generate one database connection for a single user, or several database connections forming a pool multiple users can access. A person of ordinary skill in the art will recognize there are other ways in which database authentications may be performed.

Database management system program 300 receives a SQL statement from the requestor, client application program 200 (step 304). In this instance, database management system program 300 receives the SQL statement, which includes commands, data, and the user specific key, from client application program 200 through server computer 102 over network 104.

Database management system program 300 determines whether the SQL statement creates a new data record (decision block 308). A "new data record" means a whole new row of data is inserted into a table in database 114 as defined by the SQL statement and the schema. In one aspect, according to an embodiment, a SQL statement containing an INSERT command creates a new data record.

If database management system program 300 determines the SQL statement creates a new data record (yes branch, decision block 308), database management system program 300 encrypts selected data fields with the received user specific key per the schema (step 310). The schema defines which fields in a table may get encryption before being stored. In a preferred embodiment, datasets with both sensitive and non-sensitive user data may be stored together by first encrypting the sensitive data. If non-sensitive data fields are not encrypted before being stored, queries on all non-sensitive data may still be performed without needing any of the user specific keys. Database management system program 300 encrypts the selected data fields with the received user specific key using any key encryption algorithm available to a person of ordinary skill in the art. Examples of key encryption algorithms include, but are not limited to: (a) symmetric key algorithms like AES, CAST5, RC4, DES, 3DES; or (b) asymmetrical key algorithms. In the case of asymmetrical algorithms, both encryption and decryption keys have to be passed depending on the operation, but only the encryption key may be hashed for storage (see next paragraph for explanation of hashing).

Database management system program 300 stores non-encrypted data, encrypted data, and a hash of the received key with each new record in the data table of database 114 (step 312). In a preferred embodiment, for each new data record or table row stored in database 114, database management system program 300 creates a hash of the received user specific key and stores it in the row in a meta-data field defined in the schema. A meta-data field is a column or field in a database table not visible from outside database management system program 300. A meta-data field cannot be retrieved by a table DESCRIBE command, or through SQL injection methods used by hackers. A hash of the user specific key is a non-recoverable form of the user specific key. The available hash methods are defined by the specific database management system program 300. The hash method transforms the user specific key into a string which is always the same for the same input; however, once the key is hashed the original key cannot be recovered. Database management system program 300 stores the hash of the key in database 114 so comparisons to the hash of a later received user specific key may be performed as in step 316. Since the original form of the user specific key is not permanently stored on server computer 102 or database 114, the user specific key may then be referred to as a "transient key".

Database management system program 300 sends a response to client application program 200 (step 330). Following step 312, the response may take the form of a confirmation message that the command completed without errors after the data inserts into the table of database 114. Database management system program 300 may repeat steps 304 through 330 for as long as client application program 200 runs and the user requires it. A person skilled in the art will recognize that there are many ways to format the response from database 114.

If database management system program 300 determines that the SQL statement does not create a new data record (no branch, decision block 308), database management system program 300 compares the hash of the received key to the stored hashed key when searching on encrypted or both encrypted and non-encrypted fields (step 316). The SQL statement may be one of SELECT, DELETE, or UPDATE. In each case, database management program 300 identifies table rows in the table of database 114 which contain the hashed version of the user specific key inside the meta-data field which was created for the storage of the hashed key. Database management system program 300 internally translates the WHERE clause of the SQL statement to begin with "WHERE hash(?receiveduserkey)=table.storedhashedkey AND". The result set does not include records or rows containing other stored hashed keys. In an instance of a query where no encrypted fields are being searched, database management system program 300 moves on to step 318, and no user specific key is received or compared.

Database management system program 300 performs SQL command where "search values" match "stored data". The query optimizer may decide to decrypt "stored data" or encrypt "search values" with received key per schema (step 318). Step 316 and 318 may actually happen as one step. A comparison of "search values" with "stored data" happens within a result set of records that meets the requirements of step 316. In a preferred embodiment of the invention, the stored data of encrypted fields may be decrypted with the user specific key and then compared with search values as defined in the SQL statement. An example of the search clause may be "WHERE '01/15/1972'=table.birthdatefield AND" such that table.birthdatefield is an encrypted field, and the date '01/15/1972' is entered by the user as a search value through client application program 200. Database management program 300 decrypts the data stored in table.birthdatefield using the user specific key passed in the SQL statement for each row in the result set of records from step 316. Database management program 300 compares the set of decrypted fields with the search value, and identifies the result set of table rows meeting the requirements. Multiple search values for multiple table fields may be entered by the user in client application program 200 and passed through the SQL statement, and each search value may be compared with stored data in the same manner. In another embodiment, database management system program 300 encrypts the search values with the user specific key, and compares them with stored data as defined in the SQL statement. Per the previous SQL example, database management program 300 encrypts the search values using the user specific key passed in the SQL statement. Database management program 300 compares the set of encrypted search values with the encrypted fields of stored data in the table, and identifies the result set of table rows meeting the requirements. The query optimizer within database management system program 300 may be set up to decide which method database management system program 300 performs, encrypting search values vs. decrypting stored data, based on the type of data comparison performed. The query optimizer may choose to encrypt the search values instead of decrypting the stored data, if the optimizer can leverage an encrypted index and no operations other than "=" is required. In the instance of a query where no encrypted fields are being searched, the SQL command completes without field encryption extended data definition language, and no encryption or decryption of data happens. A person skilled in the art will recognize the queries may be more complex than shown in the examples, and any combination of comparisons of encrypted and non-encrypted fields may be performed at the same time.

Database management system program 300 performs SELECT rows from table (step 324). In the case of a SQL SELECT statement, a result set of records meeting the requirements of steps 316 and 318, may be retrieved from the table in database 114 for display to the user through client application program 200 at step 330.

Database management system program 300 performs DELETE rows in table (step 326). In the case of a SQL DELETE statement, a result set of records meeting the requirements of steps 316 and 318, may be deleted from the table in database 114.

Database management system program 300 performs UPDATE rows in table and may encrypt data with received key per schema (step 328). In the case of a SQL UPDATE statement, a result set of records meeting the requirements of steps 316 and 318, may be updated in the table in database 114. Database management system program 300 encrypts the received sensitive data with the user specific key, and stores the encrypted fields by overwriting stored data. Database management system program 300 stores the received non-sensitive data in the appropriate fields by overwriting the stored data. The user specific key is already stored in the hashed form of the result set of records and does not need to be overwritten. A SQL statement may be written to update the hashed version of the user specific key as needed.

Database management system program 300 sends a response to the requestor, client application program 200 (step 330). Subsequent to step 324, the response may be a result set of records from the table. Subsequent to step 326, the response may be a confirmation of the command completing successfully. Subsequent to step 328, the response may be a confirmation of the command completing successfully. Database management system program 300 may repeat steps 304 through 330 for as long as client application program 200 runs, and the user requires it. A person of reasonable skill in the art will recognize that there are many ways to format the response from database 114.

Figure 4:
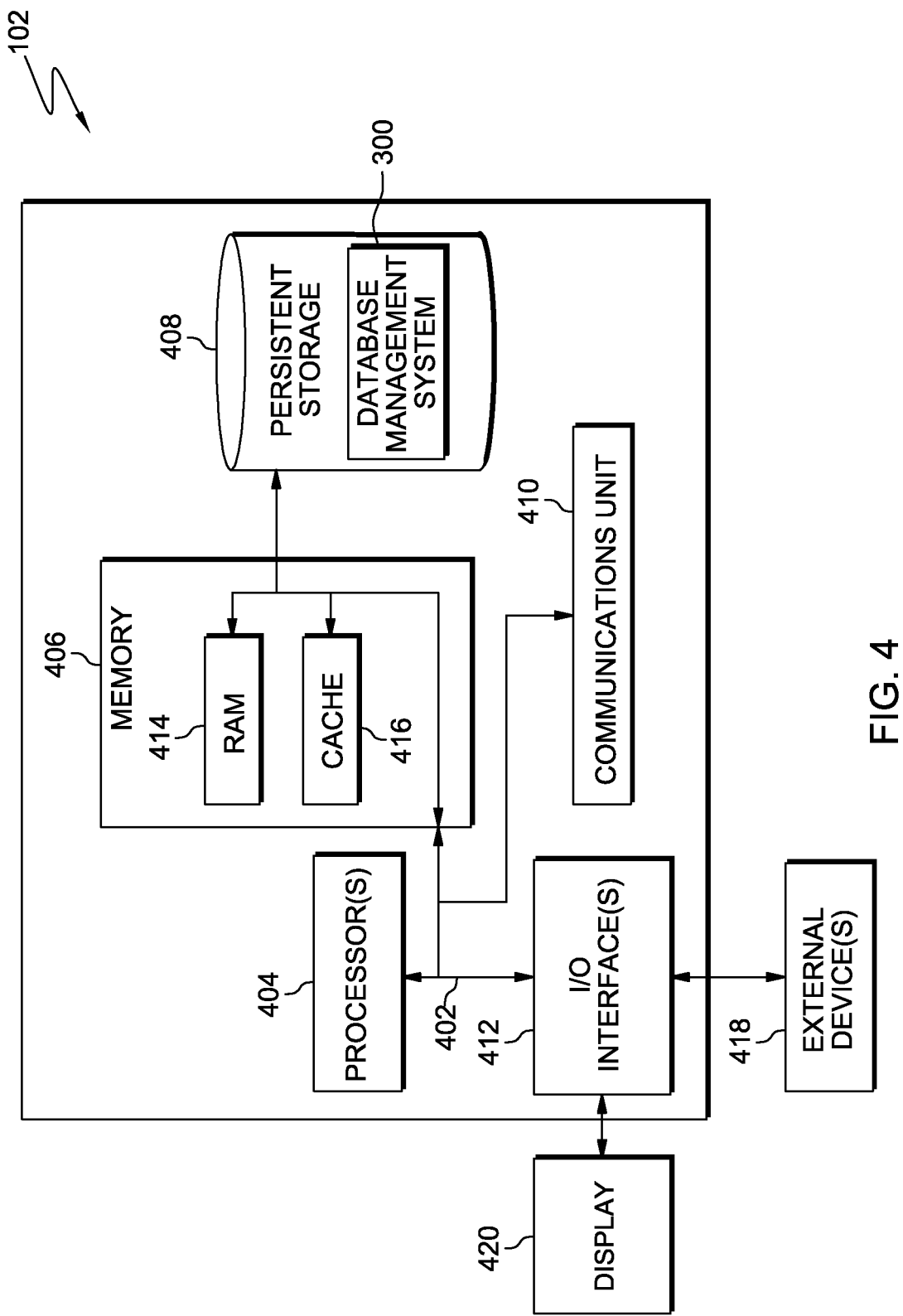
FIG. 4 depicts a block diagram of components of an exemplary computer system for implementing embodiments of the present invention.

FIG. 4 depicts a block diagram of components of server computer 102 in accordance with an illustrative embodiment of the present invention. It may be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Database management system program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of server computer 102 and client computers 106, 108, and 110. In these examples, communications unit 410 includes one or more network interface cards. Communications unit 410 may provide communications through the use of either or both physical and wireless communications links. Database management system program 300 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., database management system program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing user specific encryption in a database system, the method comprising:
    a computer receiving a query statement including a user specific key and data, the data comprising a data field requiring encryption and a data field not requiring encryption, wherein the user specific key is an encryption key that is associated with a single specific user;
    the computer identifying the data field requiring encryption;
    the computer encrypting the data field requiring encryption by using the user specific key;
    the computer inserting both the encrypted data field and the non-encrypted data field into a table row in a database;
    the computer creating a hash of the user specific key; and
    the computer inserting the hash of the user specific key in the table row with the data, wherein the hash of the user specific key is inserted as metadata included with the encrypted data field such that the user specific key is stored in a non-recoverable form that is un-usable for decryption of the encrypted data field.

2. The method of claim 1, further comprising:
    the computer receiving a second query statement including a second user specific key and a search term from a requestor;
    the computer creating a hash of the second user specific key;
    the computer identifying table rows by comparing the hash of the second user specific key with all hashed user specific keys in the table rows;
    the computer identifying table rows by comparing stored data in the identified table rows with the search term; and
    the computer processing the query statement, and sending output to the requestor.

3. The method of claim 1, further comprising creating a database table for the database, wherein:
    the database table includes a defined field encryption property for data fields in the database table utilizing a field encryption extended data definition language;
    at least one data field in a table row of the database table is identified, through a schema, as needing encryption by a user specific key; and
    a meta-data field in the table row is identified, through the schema, as receiving a hash of the user specific key.

4. The method of claim 1, wherein creating a user specific key comprises:
    the computer determining access rights of a user to a database; and
    the computer defining the user specific key through user input.

5. The method of claim 1, wherein the computer identifying the data field requiring encryption comprises:
    the computer checking in the database table schema for the field encryption property of the data field in the query.

6. The method of claim 2, wherein identifying table rows by comparing stored data in the identified table rows with the search term comprises:
    the computer determining an encrypted data field from the stored data needing decryption;
    the computer decrypting data in the encrypted data field using the user specific key; and
    the computer identifying table rows by comparing the decrypted data from the identified table rows to the search term.

7. The method of claim 2, wherein identifying table rows by comparing stored data in the identified table rows with the search term comprises:
    the computer determining a selected search term needing encryption;
    the computer encrypting the selected search term using the user specific key; and
    the computer identifying table rows by comparing the encrypted search term to the stored data in the identified table rows.

8. A computer program product for implementing user specific encryption in a database system, the computer program product comprising:
    one or more computer-readable storage media and program instructions stored on the one or more computer-readable storage media, the program instructions comprising:
    program instructions to receive a query statement including a user specific key and data, the data comprising a data field requiring encryption and a data field not requiring encryption, wherein the user specific key is an encryption key that is associated with a single specific user;
    program instructions to identify the data field requiring encryption;
    program instructions to encrypt the data field requiring encryption by using the user specific key;
    program instructions to insert both the encrypted data field and the non-encrypted data field into a table row in a database;
    program instructions to create a hash of the user specific key; and
    program instructions to insert the hash of the user specific key in the table row with the data, wherein the hash of the user specific key is inserted as metadata included with the encrypted data field such that the user specific key is stored in a non-recoverable form that is un-usable for decryption of the encrypted data field.

9. The computer program product of claim 8, further comprising program instructions stored on the one or more computer readable storage media, to:
receive a second query statement including a second user specific key and a search term from a requestor;
create a hash of the second user specific key;
identify table rows by comparing the hash of the second user specific key with all hashed user specific keys in the table rows;
identify table rows by comparing stored data in the identified table rows with the search term; and
process the query statement, and send output to the requestor.

10. The computer program product of claim 8, further comprising program instructions stored on the one or more computer readable storage media, to create a database table for the database, wherein:
the database table includes a defined field encryption property for data fields in the database table utilizing a field encryption extended data definition language;
at least one data field in a table row of the database table is identified, through a schema, as needing encryption by a user specific key; and
a meta-data field in the table row is identified, through the schema, as receiving a hash of the user specific key.

11. The computer program product of claim 8, wherein the program instructions to create a user specific key comprise:
program instructions to determine access rights of a user to a database; and
program instructions to define the user specific key through user input.

12. The computer program product of claim 8, wherein the program instructions to identify the data field requiring encryption comprise:
program instructions to check in the database table schema for the field encryption property of the data field in the query.

13. The computer program product of claim 9, wherein the program instructions to identify table rows by comparing stored data in the identified table rows with the search term comprise:
program instructions to determine an encrypted data field from the stored data needing decryption;
program instructions to decrypt data in the encrypted data field using the user specific key; and
program instructions to identify table rows by comparing the decrypted data from the identified table rows to the search term.

14. The computer program product of claim 9, wherein the program instructions to identify table rows by comparing stored data in the identified table rows with the search term comprise:
program instructions to determine a selected search term needing encryption;
program instructions to encrypt the selected search term using the user specific key; and
program instructions to identify table rows by comparing the encrypted search term to the stored data in the identified table rows.

15. A computer system for implementing user specific encryption in a database system, the computer system comprising:
one or more computer processors; and
one or more computer-readable storage media storing program instructions, wherein at least one of the one or more computer processors executes the program instructions to:
receive a query statement including a user specific key and data, the data comprising a data field requiring encryption and a data field not requiring encryption, wherein the user specific key is an encryption key that is associated with a single specific user;
identify the data field requiring encryption;
encrypt the data field requiring encryption by using the user specific key;
insert both the encrypted data field and the non-encrypted data field into a table row in a database;
create a hash of the user specific key; and
insert the hash of the user specific key in the table row with the data, wherein the hash of the user specific key is inserted as metadata included with the encrypted data field such that the user specific key is stored in a non-recoverable form that is un-usable for decryption of the encrypted data field.

16. The computer system of claim 15, wherein at least one of the one or more computer processors executes the program instructions to:
receive a second query statement including a second user specific key and a search term from a requestor;
create a hash of the second user specific key;
identify table rows by comparing the hash of the second user specific key with all hashed user specific keys in the table rows;
identify table rows by comparing stored data in the identified table rows with the search term; and
process the query statement, and send output to the requestor.

17. The computer system of claim 15, further comprising program instructions stored on the one or more computer-readable storage media storing program instructions, wherein at least one of the one or more computer processors executes the program instructions to create a database table for the database, wherein:
the database table includes a defined field encryption property for data fields in the database table utilizing a field encryption extended data definition language;
at least one data field in a table row of the database table is identified, through a schema, as needing encryption by a user specific key; and
a meta-data field in the table row is identified, through the schema, as receiving a hash of the user specific key.

18. The computer system of claim 15 wherein the program instructions executed to create a user specific key comprise program instructions to:
determine access rights of a user to a database; and
define the user specific key through user input.

19. The computer system of claim 16, wherein the program instructions executed to identify table rows by comparing stored data in the identified table rows with the search term comprise program instructions to:
determine a encrypted data field from the stored data needing decryption;
decrypt data in the encrypted data field using the user specific key; and
identify table rows by comparing the decrypted data from the identified table rows to the search term.

20. The computer system of claim 16, wherein the program instructions executed to identify table rows by comparing stored data in the identified table rows with the search term comprise program instructions to:
determine a selected search term needing encryption;
encrypt the selected search term using the user specific key; and identify table rows by comparing the encrypted search term to the stored data in the identified table rows.

* * * * *